(12) United States Patent
Utz et al.

(10) Patent No.: US 12,397,534 B2
(45) Date of Patent: Aug. 26, 2025

(54) HEAT RESISTANT RECYCLE-READY RETORT PACKAGING

(71) Applicant: AMCOR FLEXIBLES NORTH AMERICA, INC., Neenah, WI (US)

(72) Inventors: Helmar Utz, Koppigen (CH); Roy Christopherson, Shrivenham (GB); Sara Menghetti, Cecina (IT); Florian Chapalain, Marcq-en-Baoeul (FR); Peter Ettridge, Worcester (GB)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 0 days.

(21) Appl. No.: 17/923,557

(22) PCT Filed: Jun. 8, 2020

(86) PCT No.: PCT/US2020/036639
§ 371 (c)(1),
(2) Date: Nov. 4, 2022

(87) PCT Pub. No.: WO2021/251945
PCT Pub. Date: Dec. 16, 2021

(65) Prior Publication Data
US 2023/0182457 A1 Jun. 15, 2023

(51) Int. Cl.
*B32B 27/32* (2006.01)
*B32B 7/12* (2006.01)
(Continued)

(52) U.S. Cl.
CPC ............ *B32B 27/32* (2013.01); *B32B 7/12* (2013.01); *B32B 27/08* (2013.01); *B65D 65/40* (2013.01);
(Continued)

(58) Field of Classification Search
CPC .......... B32B 27/32; B32B 7/12; B32B 27/08; B32B 2250/242; B32B 2255/10;
(Continued)

(56) References Cited

U.S. PATENT DOCUMENTS 4,764,404 A * 8/1988 Genske ................... B29C 48/08
428/476.1
4,769,261 A 9/1988 Hazelton et al.
(Continued)

FOREIGN PATENT DOCUMENTS

CN 114126974 A 3/2022
EP 0115163 A1 8/1984
(Continued)

OTHER PUBLICATIONS

"F1927-07 Standard Test Method for Determination of Oxygen Gas Transmission Rate, Permeability and Permeance at Controlled Relative Humidity Through Barrier Materials Using a Coulometric Detector" ASTM International (Aug. 2007): pp. 1-6.
(Continued)

*Primary Examiner* — James C Yager

(57) ABSTRACT

A laminated polypropylene-based film suitable for retort packaging having an exterior film, a barrier layer, and a sealing layer. The retort packaging film has a total composition including high levels of polyolefin-based polymers and polypropylene-based polymers such that the material can be processed efficiently in a polypropylene recycling process. Advantageously, the film retains the properties required to suitably withstand the retort process and produce a high-quality shelf-stable packaged product.

7 Claims, 4 Drawing Sheets

(51) Int. Cl.
    *B32B 27/08*     (2006.01)
    *B65D 65/40*    (2006.01)
    *B65D 75/00*    (2006.01)
    *C08J 5/12*     (2006.01)
    *C08J 7/048*    (2020.01)
    *C08J 7/06*     (2006.01)

(52) U.S. Cl.
    CPC ............ *B65D 75/008* (2013.01); *C08J 5/124* (2013.01); *C08J 7/048* (2020.01); *C08J 7/06* (2013.01); *B32B 2250/242* (2013.01); *B32B 2255/10* (2013.01); *B32B 2255/20* (2013.01); *B32B 2255/26* (2013.01); *B32B 2307/306* (2013.01); *B32B 2307/31* (2013.01); *B32B 2307/518* (2013.01); *B32B 2307/7244* (2013.01); *B32B 2439/46* (2013.01); *C08J 2323/12* (2013.01); *C08J 2475/04* (2013.01)

(58) Field of Classification Search
    CPC ............ B32B 2255/20; B32B 2255/26; B32B 2307/306; B32B 2307/31; B32B 2307/518; B32B 2307/7244; B32B 2439/46; B32B 2255/205; B32B 7/027; B32B 7/03; B32B 2307/246; B32B 2250/02; B32B 2307/514; B32B 2323/10; B32B 2439/70; B65D 65/40; B65D 75/008; C08J 7/048; C08J 7/06; C08J 2323/12; C08J 2475/04; C08J 2423/12; C08J 7/0423; C23C 14/10; C09J 2301/41; C09J 2423/10; C09J 2423/106; C09J 7/241
    See application file for complete search history.

(56) References Cited

U.S. PATENT DOCUMENTS

| | | | |
|---|---|---|---|
| 5,071,686 | A | 12/1991 | Genske et al. |
| 5,112,673 | A | 5/1992 | Sawada et al. |
| 5,851,640 | A | 12/1998 | Schuhmann et al. |
| 6,263,644 | B1 * | 7/2001 | Ghini ............... B65B 51/16 53/466 |
| 6,663,940 | B1 | 12/2003 | Osame et al. |
| 9,511,567 | B2 | 12/2016 | Hu et al. |
| 2003/0017352 | A1 | 1/2003 | Dayrit et al. |
| 2003/0027008 | A1 | 2/2003 | Eckstein et al. |
| 2003/0203210 | A1 | 10/2003 | Graff et al. |
| 2004/0048098 | A1 | 3/2004 | Hoffman |
| 2004/0131868 | A1 | 7/2004 | Watanabe et al. |
| 2005/0031814 | A1 | 2/2005 | Dawes |
| 2008/0281048 | A1 | 11/2008 | Mier et al. |
| 2009/0061061 | A1 * | 3/2009 | Beckwith ............... B65D 65/22 426/546 |
| 2011/0189423 | A1 * | 8/2011 | Townsend ............... B32B 7/06 428/58 |
| 2013/0164551 | A1 | 6/2013 | Daum |
| 2014/0252001 | A1 | 9/2014 | Paolilli et al. |
| 2015/0360828 | A1 | 12/2015 | Forster et al. |
| 2017/0036832 | A1 | 2/2017 | Omura et al. |
| 2017/0158400 | A1 | 6/2017 | Priscal et al. |
| 2017/0360055 | A1 | 12/2017 | Huebner et al. |
| 2018/0126695 | A1 | 5/2018 | Niedersüss et al. |
| 2018/0170017 | A1 * | 6/2018 | Ettridge ............... C23C 14/221 |
| 2018/0370202 | A1 | 12/2018 | Niedersüss et al. |
| 2021/0347148 | A1 | 11/2021 | Yamada et al. |
| 2022/0153006 | A1 | 5/2022 | Tanaka et al. |

FOREIGN PATENT DOCUMENTS

| | | |
|---|---|---|
| EP | 2730403 A1 | 5/2014 |
| EP | 30780490 A1 | 10/2016 |
| EP | 3603955 A1 | 2/2020 |
| EP | 3845380 A1 | 7/2021 |
| EP | 4005791 A1 | 6/2022 |
| JP | S62212125 A | 9/1987 |
| JP | H03213335 A1 | 9/1991 |
| JP | H0414440 A | 1/1992 |
| JP | H06179473 A | 6/1994 |
| JP | 07041042 A | 2/1995 |
| JP | H741042 A | 2/1995 |
| JP | H07300160 A | 11/1995 |
| JP | 1997290477 A | 11/1997 |
| JP | H10249989 A | 9/1998 |
| JP | 1998329286 A | 12/1998 |
| JP | H10329286 A | 12/1998 |
| JP | H1111533 A | 1/1999 |
| JP | 2000355069 A | 12/2000 |
| JP | 2002120858 A | 4/2002 |
| JP | 2002307628 A | 10/2002 |
| JP | 2002309023 A | 10/2002 |
| JP | 2006056092 A | 3/2006 |
| JP | 2006224470 A | 8/2006 |
| JP | 2006528726 A | 12/2006 |
| JP | 2008132614 A | 6/2008 |
| JP | 2013112736 A | 6/2013 |
| JP | 2017214530 A | 12/2017 |
| JP | 2017222759 A | 12/2017 |
| JP | 2019031305 A | 2/2019 |
| JP | 2020023130 A | 2/2020 |
| JP | 2020037186 A | 3/2020 |
| JP | 2020037189 A | 3/2020 |
| JP | 2020040257 A | 3/2020 |
| JP | 2020082414 A | 6/2020 |
| JP | 2020157515 A | 10/2020 |
| JP | 202120391 A | 2/2021 |
| JP | 2021020391 A | 2/2021 |
| JP | 2021024136 A | 2/2021 |
| JP | 2001058363 A | 3/2021 |
| RU | 177087 U1 | 2/2018 |
| WO | 9526268 A1 | 10/1995 |
| WO | 2009073685 A1 | 6/2009 |
| WO | 2016174219 A1 | 11/2016 |
| WO | 2017005597 A1 | 1/2017 |
| WO | 2017069609 A1 | 4/2017 |
| WO | 2018181900 A1 | 10/2018 |
| WO | 2019012110 A1 | 1/2019 |
| WO | 2020045629 A1 | 3/2020 |

OTHER PUBLICATIONS

PCT International Search Report, International Application No. PCT/US2020/036639, issued Sep. 14, 2020, 2 pages.
PCT International Search Report, International Application No. PCT/US2020/054694, issued Jan. 21, 2021, 3 pages.
Third party observations submitted on May 8, 2024 in JP Application No. 2023-520546, 7 pages.
Katsura, "Polymer Films for Packaging Materials," Sen'i Gakkaishi vol. 41. No. 9, 1985, pp. 348-354.
Third party observations submitted on Jun. 12, 2024 in JP Application No. 2023-520546, 3 pages.
Third party observations submitted on Sep. 5, 2024 in JP Application No. 2023-520546, 3 pages.
Third party observations submitted on Sep. 2, 2024 in JP Application No. 2022-575396, 3 pages.
Third party observations submitted on Sep. 25, 2024 in JP Application No. 2022-575396, 3 pages.
Amcor, Sustainability & The Circular Economy: Can they ever co-exist?, Sustainable Retail Summit, Oct. 26, 2018, 26 pages.
WIPF AG, Sustainable flexible packaging, 2019, 12 pages.
Third party observations submitted on Mar. 8, 2024 in JP Application No. 2022-575396, 6 pages.
Third party observations submitted on Mar. 29, 2024 in JP Application No. 2022-575396, 11 pages.
Third party observations submitted on Apr. 2, 2024 in JP Application No. 2022-575396, 4 pages.
Mitsui Chemicals, "ADMER NF530E, Technical Data Sheet", Sep. 2022, 2 pages.

(56) References Cited

OTHER PUBLICATIONS

Third party observations submitted on Nov. 26, 2024 in EP Application No. 20956888.0, 12 pages.
Third party observations submitted on Apr. 8, 2025 in EP Application No. 20956888.0, 28 pages.
WIPF, Sustainable flexible packaging, Dec. 17, 2015, 8 pages.
Third party observations submitted on Apr. 9, 2025 in JP Application No. 2022-575396, 8 pages.
Third party observations submitted on Oct. 11, 2024 in JP Application No. 2022-575396, 7 pages.
AMCOR, "Plastic Packaging, Sustainability & The Circular Economy: Can they ever coexist?", Oct. 26, 2018, 26 pages.
Third party observations submitted on May 20, 2025 in EP Application No. 20940215.5, 36 pages.
WIPF, "Sustainability Sustainable flexible packaging",(https://issuu.com/wipfag/docs/wipf_nachhaltigkeitsbroschuere_e_we/1) Dec. 17, 2015, 12 pages.

* cited by examiner

HEAT RESISTANT RECYCLE-READY RETORT PACKAGING

TECHNICAL FIELD

This disclosure is related to film structures, specifically retortable packaging films and the packaged products made therefrom. The packaging films described herein may be recyclable in a polyolefin-based process.

BACKGROUND

Pasteurization operations (i.e. retort) are used for the sterilization and thermal processing of food or other products contained within hermetically sealed packaging components. Food or other products are packed and sealed in a retortable package, such as a pouch, and transferred to an autoclave unit where it is subjected to temperatures generally exceeding the boiling point of water for an extended period. The autoclave process also uses over-pressure to complete the sterilization step.

Specialized flexible packaging films are used for applications which use an autoclave sterilization process to create a shelf-stable or sterilized product. Commercially available shelf-stable products such as pre-cooked rice, moist pet foods, or tuna are available in flexible packaging formats such as stand-up pouches, lidded trays or flow-wrap. The packaged products can be stored at ambient conditions for several months or years, depending on the barrier of the packaging films.

Flexible packaging films used for in-package sterilization often have many different layers, each layer contributing one or more important attributes necessary for the high demand application. For example, the packaging films may require high stiffness and high heat resistance to work well in a high-speed packaging process. The packaging film must be able to withstand the high temperatures and pressure changes of the sterilization process without losing seal integrity or becoming unappealing in appearance.

A typical flexible packaging film intended for a sterilized product application may include a combination of materials such as polyester or polyamide, providing excellent heat resistance, dimensional stability, and stiffness; aluminum foil, providing high barrier and stiffness; and/or polyolefins providing suitable sealing characteristics. Unfortunately, when this wide variety of materials is combined in a single packaging film, the film becomes difficult to recycle.

SUMMARY

Described herein is a flexible laminated packaging film that can be used in retorted product applications, having the important advantage of being recyclable in a polyolefin recycling stream. Despite having a composition with a high polyolefin content, the retort packaging film retains the characteristics that allow it to function well in high-speed packaging operations and survive the sterilization cycle while retaining good appearance, excellent barrier properties and hermetic integrity.

The retort packaging films described herein have an exterior polypropylene-based film, a barrier layer and a sealing layer. The retort packaging film has a total composition including at least 80% polyolefin-based polymers, by weight. The retort packaging film has a total composition including at least 80% polypropylene-based polymers, by weight.

In some embodiments, the retort packaging film additionally has an interior polypropylene-based film. One or both of the interior and exterior polypropylene-based films may be oriented.

Preferred embodiments of the retort packaging film have a barrier layer containing metal or an inorganic oxide. The barrier layer is deposited on a surface of either the exterior or interior polypropylene-based film.

In certain embodiments, the sealing layer of the retort packaging film is part of a multilayer film that also has a backing layer. The sealing layer can be heat sealed to itself at a sealing temperature of 130° C. when sealed for a dwell time of 1 second and at a pressure of 440 N/15 cm². In some cases, this sealing performance is achieved when the sealing layer contains a polypropylene copolymer having a melt temperature less than or equal to 135° C. Ideally, the exterior polypropylene-based film and the sealing layer are essentially free from polymers other than polyolefins.

A retort package can be formed from one or more of the retort packaging films.

From the perspective of a retort package, it is made from a retort packaging film having a total composition having at least 80% polyolefin-based materials. The retort packaging film has a barrier layer providing an oxygen transmission rate of less than 2.0 cm³/m² day or preferably less than 1.0 cm³/m² day.

Also disclosed herein are shelf-stable packaged products. The shelf-stable packaged product includes a retort packaging film having at least 80% polypropylene-based polymers and a product hermetically sealed within the retort packaging film.

Also disclosed herein are methods to produce a shelf-stable packaged product. The methods include forming an initial package by heat sealing the retort packaging film to itself using a sealing temperature of less than or equal to 160° C., filling the initial packaging with a product, heat sealing the initial package to completely enclose the product within a final package and exposing the final package to an autoclave process.

BRIEF DESCRIPTION OF THE DRAWINGS

The disclosure may be more completely understood in consideration of the following detailed description of various embodiments of the disclosure in connection with the accompanying drawings, in which.

Figure 1:
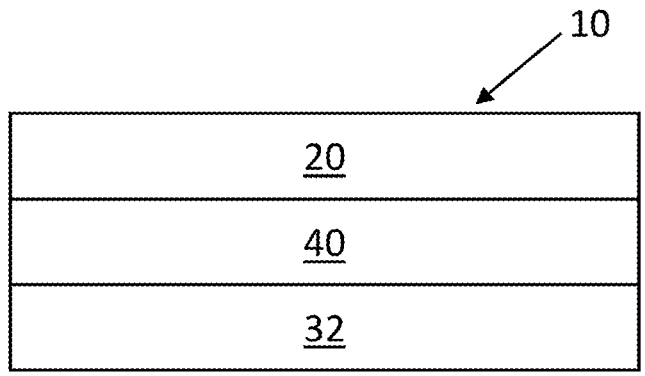
FIG. 1 is a schematic side view of an embodiment of a retort packaging film.

The drawings show some but not all embodiments. The elements depicted in the drawings are illustrative and not necessarily to scale, and the same (or similar) reference numbers denote the same (or similar) features throughout the drawings.

DETAILED DESCRIPTION

Current flexible retort packaging films contain a multitude of different materials, designed to provide high performance in demanding applications. The structures commonly contain layers that include polyester, polyamide, polyethylene, polypropylene, metal and/or ethylene vinyl alcohol copolymer. Each layer of the structure is designed to offer properties such as barrier, stiffness, heat resistance, dimensional stability, puncture resistance, seal strength, and visual appeal, to name a few. The challenging functionality requirements of retort packaging and the diversity of materials in the current structures pose a major hurdle when looking to provide a more sustainable packaging solution, one that is recyclable.

As disclosed herein, a retort packaging film structure has been designed comprising high levels of polyolefin-based materials, specifically, high levels of polypropylene-based materials. Despite the elimination of many of the materials commonly used in retort packaging, the structure retains all the required attributes of barrier, heat resistance, appearance and seal integrity. Advantageously, the structure is suitable for easy recycling.

Specifically, the retort packaging film structure has a design such that the heat seal initiation temperature of the sealing layer is low enough to match the only moderate heat resistance of the exterior surface. Even though the sealing layer now has a rather low temperature softening point, the sealing layer still has enough integrity to survive the high temperatures of the retort sterilization process along with other abuses a package may endure during distribution and use. The retort packaging film can be formed into retort packages at lower sealing temperatures, retaining excellent visual appearance. Additionally, the packaging structure maintains excellent barrier properties and visual appearance, even after the film has been formed into a package, filled, hermetically sealed and undergone the retort sterilization process.

The retort packaging films described herein contain at least 80% polyolefin-based polymers by weight, and at least 50% polypropylene-based polymers, by weight. Materials that are not polyolefin-based polymers are minimized. The exterior of the packaging film has a heat-resistant polypropylene-based film. The interior of the packaging film has a sealing layer that is a polypropylene-based blend of polymers. The retort packaging film contains a barrier layer that is generally not a polyolefin-based material. The film may also have other materials such as adhesives and inks.

Using the packaging film structure design elements as described herein, a recyclable packaging film can be achieved. The films are suitable to be recycled in a polyolefin-based recycling process because of the high polyolefin content. The films are also suitable to be recycled in a polypropylene-based recycling process because of the high polypropylene content. Specifically, the films may have low levels of, or may be essentially free from, materials such as polyester, polyamide, chlorine containing polymers and aluminum foil. Preferably, the retort packaging films are free from an aluminum foil. As used herein "aluminum foil" is a web of metal having a thickness of at least 1 micron, typically more than 5 micron. The films may contain non-polyolefin-based polymers such as those used in adhesive layers or ink layers, but these are minimized and generally less than 10% of the overall composition, by weight. The films may contain non-polymeric materials such as barrier materials, but these are minimized and generally less than 10% of the overall composition, by weight.

Retort Packaging Film

Described herein are retort packaging films and laminated polypropylene-based films suitable for retort packaging as well as the retort packages and shelf-stable packaged products made therefrom. As used herein, a "retort packaging film" or "retort packaging" is a film, or package made from the film, that can be filled with product, sealed, and remain hermetically sealed after being exposed to a typical retort sterilization process. Typical retort sterilization is a batch process that uses temperatures from about 100° C. to about 150° C., over-pressure up to about 70 psi (483 kPa), and may have a duration from a few minutes up to several hours. Common retort processes used for products packaged in flexible films include steam or water immersion. Food or other products packaged in retort packaging film and retort sterilized can be stored at ambient conditions for extended periods of time (i.e. are shelf-stable), retaining sterility. Because the retort process is incredibly abusive, very specialized flexible packaging films have been designed to survive the process.

Various types of packaging materials can be used in retort sterilization processes, including cans, jars and flexible polymeric-based packaging, such as the retort packaging films and laminated polypropylene-based films described herein. The advantages of using flexible packaging for retort applications include weight reduction and a reduction in the energy required to get the contents of the package to the conditions at which the sterilization occurs. A retort packaging film may have a thickness from about 2.5 mil (63.5 micron) to about 10 mil (254 micron), or from about 3 mil (76.2 micron) to about 6 mil (152.4 micron).

Referring now to FIG. 1, an embodiment of the retort packaging film 10 includes an exterior polypropylene-based film 20, a barrier layer 40 and a sealing layer 32. The exterior polypropylene-based film 20 is located on one major surface of the retort packaging film and becomes the exposed outside surface of a retort package. The sealing layer 32 is located on the other major surface of the retort packaging film and becomes the product contact side when the retort packaging film is formed into a retort package. The barrier layer 40 is located interior to the surfaces of the retort packaging film. The retort packaging film has a total composition including at least 80% polyolefin-based polymers, by weight. The retort packaging film has a total composition including at least 80% polypropylene-based polymers, by weight.

As used herein, a "layer" is a homogeneous building block of films. Layers may be continuous or discontinuous (i.e. patterned) with the length and width of the film. As used herein the term "film" is a mono-layer or multi-layer web that has an insignificant z-direction dimension (thickness) as compared to the x- and y-direction dimensions (length and width), not unlike a piece of paper. Films are generally regarded as having two major surfaces, opposite each other, expanding in the length and width directions. Films may be built from an unlimited number of films and/or layers, the films and/or layers being bonded together to form a composite article. A portion of a packaging film may be referred to as a layer or a film.

The retort packaging film contains at least one polypropylene-based film. As used herein, a "polypropylene-based film" has a composition including at least 50%, or at least 90% polypropylene-based polymer, by weight. In some cases, the polypropylene-based film may be essentially 100% polypropylene-based polymer.

The exterior polypropylene-based film may be oriented. As used herein, the term "oriented" indicates that the film has been heated to a temperature lower than the melting point of the material and stretched at least 2x. This is typically accomplished by a double- or triple-bubble process, by a tenter-frame process or an MDO process using heated rolls. A typical blown film process does impart some stretching of the film, but not enough to be considered oriented as described herein. The film may be biaxially oriented or mono-axially oriented in either direction. The exterior polypropylene-based film is preferably heat set (i.e. annealed) after orientation, such that it is dimensionally stable under elevated temperature conditions that might be experienced during conversion of the retort film laminate (i.e. printing or laminating) or during the use of the laminate (i.e. heat sealing or retort sterilization). The exterior polypropylene-base film may be produced using specific polymers and may be oriented using specific conditions which optimize the heat resistance of the film.

The exterior polypropylene-based film may be an oriented polypropylene film, such as biaxially oriented polypropylene. The oriented polypropylene film may have one or more layers and may have specialized coatings, such as matte lacquer. Any of the layers of the oriented polypropylene film may contain a pigment, such as titanium dioxide, to make the film opaque to visible light. The film may be a cavitated biaxially oriented polypropylene, resulting in a film opaque to visible light. The biaxially oriented polypropylene may be clear to visible light. In some embodiments, the exterior polypropylene-based film is a biaxially oriented polypropylene film that essentially comprises polypropylene. The exterior polypropylene-based film may have, but is not limited to, a thickness of about 12, about 20, about 25 or about 30 micron.

Commercial examples of films that may be used as the exterior polypropylene-based film include Bicor™ NND20 (non-heat sealable, one side treated BOPP, available from Jindal Films), PL1 (non-heat sealable, one side treated BOPP, available from Polibak Plastik Film San. ye Tic.A.S.) and PPTE_LAM (non-heat sealable, one side treated, available from Poligal.

As used herein, the term "exterior" is used to describe a film or layer that is located on one of the major surfaces of the film in which it is comprised. As used herein, the term "interior" is used to describe a film or layer that is not located on the surface of the film in which it is comprised. An interior film or layer is adjacent to another film or layer on both sides.

The barrier layer of the retort packaging film is generally coextensive with the retort packaging film and contains a barrier material. The barrier layer provides for reduced transmission to gases such as oxygen (i.e. containing an oxygen barrier material). The barrier layer may additionally provide reduced transmission to moisture (i.e. containing a moisture barrier material). The barrier layer is typically an interior layer of the retort packaging film to protect the integrity of this important layer. The barrier material may be polymeric in nature, such as polyamide, ethylene vinyl alcohol copolymer or polyvinyl alcohol copolymer. The barrier material may be metallic, such as a thin deposition of aluminum. The barrier layer may be transparent inorganic oxide coating such as AlOx or SiOx. The barrier layer may be multi-layer and contain different layers of barrier materials. The barrier layer may be a blend of multiple barrier materials. The barrier layer provides the specific barrier required to preserve the product within a retorted package throughout an extended shelf-life which may be several months or even more than one year.

The barrier layer may be located on a surface of the exterior polypropylene-based film. In some embodiments of the retort packaging film, the barrier layer is located on the interior surface of the exterior polypropylene-based film facing the sealing layer. Alternatively, the barrier layer is deposited on a surface of an interior film.

The barrier layer reduces the influx of oxygen through the retort packaging film during the shelf-life of the packaged product (i.e. while the package is hermetically sealed). In some embodiments, before being exposed to a retort sterilization process, the retort packaging film has an average oxygen transmission rate (OTR) value that is less than 2 $cm^3/m^2/day$, less than 1 $cm^3/m^2/day$, less than 0.5 $cm^3/m^2/day$, or less than 0.1 $cm^3/m^2/day$ (measured according to ASTM F1927 using conditions of 1 atmosphere, 23° C. and 50% RH). In some embodiments, after being exposed to a representative retort sterilization process, the retort packaging film has an average OTR value that is less than 2 $cm^3/m^2/day$, less than 1 $cm^3/m^2/day$, less than 0.5 $cm^3/m^2/day$, or less than 0.1 $cm^3/m^2/day$. The average OTR value may be near, at or below the minimum detection level of a testing device. The representative retort sterilization process is completed by cutting a DIN A4 sized portion of the retort packaging film and exposing it to a steam sterilization process for 60 minutes at 128° C. and overpressure of 2.5 bar, followed by water shower cooling.

The sealing layer of the retort packaging film has a composition that will allow the formation of a heat seal, thus forming a hermetic package. As used herein, the term "heat seal" or "heat sealed" refers to two or more surfaces that have been bonded together by application of both heat and pressure for a short period of time, or by way of an ultrasonic energy sealing process. Heat sealing and ultrasonic sealing are well-known and commonly used processes for creating packages and are familiar to those skilled in the art.

The sealing layer is necessarily on the surface of the retort packaging film in order to facilitate the function of sealing. During use of the retort packaging film in a retort package, the sealing layer may be heat sealed to itself or another packaging component. During heat sealing, the sealing layer softens, allowing formation of a heat seal bond, at a sealing temperature that is lower than the temperature resistance of the exterior polypropylene-based film. The sealing layer softens at a sealing temperature that is lower than the temperature resistance of the exterior oriented film. The sealing layer should soften and form a heat seal at sealing conditions (time, temperature and pressure) that do not cause excessive shrinking or marring on the exterior surface of the retort packaging film.

The retort packaging film is targeted to contain high amounts of polyolefin, specifically polypropylene, such that it may be acceptable for a recycling process. Polyolefins have relatively low heat resistance as compared to materials traditionally used for retort packaging films (i.e. polyester, aluminum foil, polyamide). As a result of the lower heat resistance, the retort packages will be formed using a heat-sealing process with lower temperatures to avoid any shrinking or burn through. The challenge met by the retort packaging films disclosed herein is to incorporate a sealing layer that has a low heat-seal initiation temperature (HSIT) and a high seal strength and seal toughness to survive both retort processing and normal distribution and handling (i.e. drop strength and burst strength). The sealing layer must also contain materials that are approved for food contact during retort conditions, as dictated by governmental agencies for food safety.

The sealing layer may contain a material that has a low heat seal initiation temperature (HSIT). In some embodiments of the retort packaging film, the sealing layer contains a polypropylene copolymer having a melt temperature equal to or less than 135° C.

The sealing layer may be formed by any known process. For example, the sealing layer may be a heat seal lacquer that is coated onto the other layers of the retort packaging film. In other embodiments, the sealing layer is formed by an extrusion process that applies a polymer melt directly to the other layers of the retort packaging. In yet other embodiments, the sealing layer may be formed by in an off-line coextrusion process (i.e. a cast film or blown film process) and subsequently adhered to the other layers of the retort packaging film using a lamination process. The sealing layer may be comprised within a multilayer film containing 2, 3, 4 or more layers.

Figure 2:
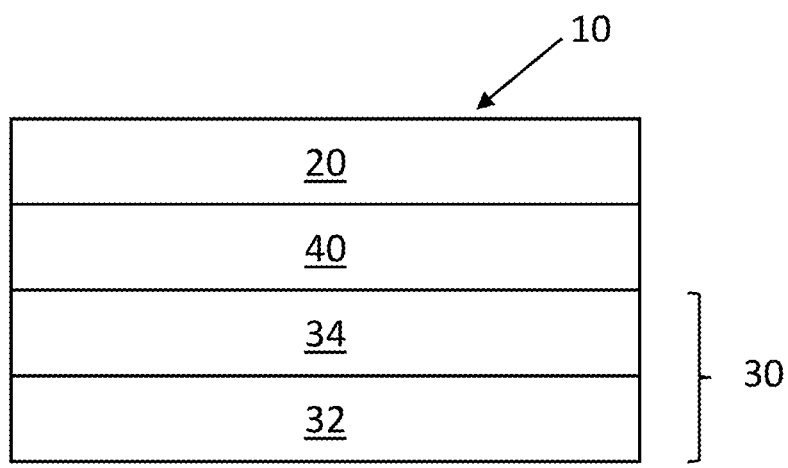
FIG. 2 is a schematic side view of an embodiment of a retort packaging film.

Referring now to FIG. 2, an embodiment of the retort packaging film 10 includes an exterior polypropylene-based film 20, a barrier layer 40, a sealing layer 32 and a backing layer 34. The sealing layer 32 and the backing layer 34 are layers within a coextruded multilayer film 30. The exterior polypropylene-based film 20 may be located on one major surface of the retort packaging film and becomes the exposed outside surface of a retort package. The sealing layer 32 is located on the other major surface of the retort packaging film and becomes the product contact side of a retort package. The backing layer 34 is located adjacent to the sealing layer 32. The barrier layer 40 is located interior to the surfaces of the retort packaging film 10. The retort packaging film has a total composition including at least 80% polyolefin-based polymers, by weight. The retort packaging film may have a total composition including at least 80% polypropylene-based polymers, by weight.

The backing layer of the coextruded multilayer film provides additional stiffness and toughness to the structure. The backing layer of the coextruded multilayer film may be formulated for good adhesion to the rest of the retort packaging film layers. In some embodiments the backing layer contains a one or more polypropylene-based polymers. The backing layer, along with other layers of the multilayer film may also contain other polyolefin-based polymers such as polyethylene-based polymers.

While the structure of the retort packaging film and any packages made therefrom contain several different elements (exterior layer, barrier layer, sealing layer, etc.) the total composition of the film or package should have high levels of a single material type (polyolefin or specifically, polypropylene) to facilitate recycling. As used herein, the term "total composition" is used to describe the entire film structure or package. Any materials, layers or components that are connected to one another in any way are part of the total composition of that article. The retort packaging films may have high levels of polyolefin-based polymers. The packaging films may have high levels of polypropylene-based polymers. The packaging films described herein, and any retort packages made therefrom, may be recyclable in a polypropylene recycling process when the article contains high amounts of polypropylene-based polymers. A mixed polyolefin recycling process can also accept relatively high levels of polyolefins that are not polypropylene, so the articles may also contain high levels of polyolefins that are not polypropylene and still be suitable for recycling.

As used herein, a "polyolefin-based polymer" refers to a homopolymer or copolymer having at least one alkene monomer linkage within the repeating backbone of the polymer. Primary examples of polyolefin-based polymers are polyethylene homopolymers and copolymers and polypropylene homopolymers and copolymers. Other examples of polyolefin-based polymers are ethylene vinyl alcohol copolymer and cyclic olefin copolymer.

The retort packaging film may have a total composition including at least 80% polyolefin-based polymers, by weight. In other words, considering all materials (polymeric and non-polymeric) within the entire retort packaging film, at least 80% by weight are polyolefin-based polymers. The retort packaging film may have a total composition including a minimum polyolefin-based polymer content of 80%, 82%, 84%, 86%, 88% or 90%, by weight. The retort packaging film may have a total composition including a maximum polyolefin-based polymer content of 100%, 99%, 98%, 97%, 96% or 95%, by weight. For example, the retort packaging film may have a total composition having from 90% to 99% polyolefin-based polymer or the retort packaging film may have a total composition having from 82% to 100% polyolefin-based polymer, by weight.

As used herein, a "polypropylene-based polymer" refers to a homopolymer or copolymer having at least one propylene monomer linkage within the repeating backbone of the polymer. The propylene linkage can be represented by the general formula: [CH2-CH(CH3)]n. Such polypropylene may be a polypropylene impact copolymer, a polypropylene random copolymer or a polypropylene homopolymer, may be syndiotactic or isotactic and/or may or may not be nucleated. A polypropylene-based polymer may be a propylene alpha-olefin copolymer.

The retort packaging film may have a total composition including at least 70% polypropylene-based polymers, by weight. In other words, considering all of the materials (polymeric and non-polymeric) within the entire retort packaging film, at least 70% by weight are polypropylene-based polymers. The retort packaging film may have a total composition including a minimum polypropylene-based polymer content of 70%, 80%, 85%, 86%, 88% or 90%, by weight. The retort packaging film may have a total composition including a maximum polypropylene-based polymer content of 100%, 99%, 98%, 97%, 96% or 95%, by weight. For example, the retort packaging film may have a total composition having from 70% to 98% polypropylene-based polymer or the retort packaging film may have a total composition having from 80% to 100% polypropylene-based polymer, by weight.

In some embodiments, the retort packaging film has a total composition that includes less than 10% polymers other than polyolefin-based polymers, by weight. In addition to having high polyolefin and polypropylene content, the retort packaging film may have low levels of non-polyolefin polymers, with respect to the total composition. Non-polyolefin polymers that may be included in the retort packaging film include polyamides, polyacrylates and polyurethanes. These polymers may be present in an extruded layer or within a printed ink or adhesive layer. The retort packaging film may have a total composition that includes less than 9%, 8%, 7%, 6% or 5% polymers other than polyolefin-based polymers, by weight.

In some embodiments, the retort packaging film is essentially free from polymers other than polyolefin-based polymers. In other words, any non-polyolefin polymers that may be present in the retort packaging film do not affect the basic and material properties of the film.

Figure 3:
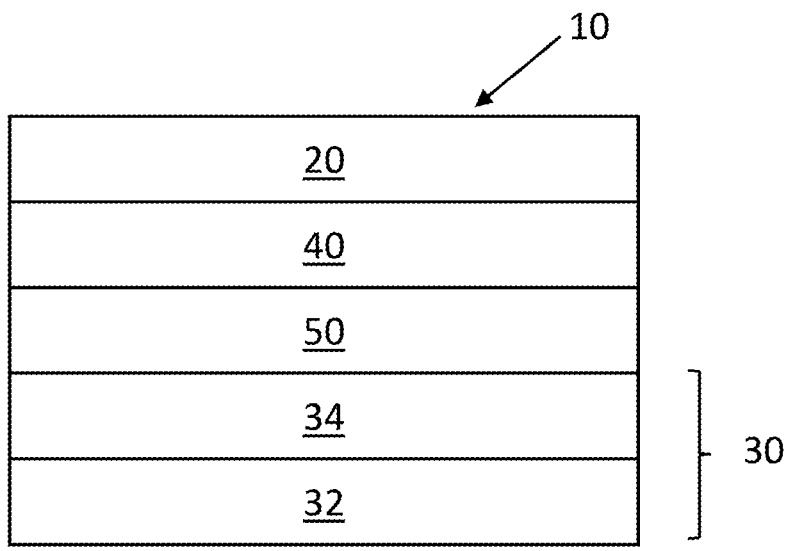
FIG. 3 is a schematic side view of an embodiment of a retort packaging film.

Referring now to FIG. 3, an embodiment of the retort packaging film 10 includes an exterior polypropylene-based film 20, a barrier layer 40, an interior polypropylene-based film 50, a sealing layer 32 and a backing layer 34. The sealing layer 32 and the backing layer 34 are layers within a coextruded multilayer film 30. The exterior polypropylene-based film 20 may be located on one major surface of the retort packaging film and becomes the exposed outside surface of a retort package. The sealing layer 32 is located on the other major surface of the retort packaging film and becomes the product contact side of a retort package. The backing layer 34 is located adjacent to the sealing layer 32. The interior polypropylene-based film 50 and the barrier layer 40 are located interior to the surfaces of the retort packaging film 10. The retort packaging film may have a total composition including at least 80% polyolefin-based polymers, by weight. The retort packaging film has a total composition including at least 80% polypropylene-based polymers, by weight.

The barrier layer may be in contact with the interior surface of the exterior polypropylene-base film. The barrier layer may be in contact with either side of the interior polypropylene based film.

The interior polypropylene-based film may be oriented. The film may be biaxially oriented or mono-axially oriented in either direction. The interior polypropylene-based film is preferably heat set (i.e. annealed) such that it is dimensionally stable under elevated temperature conditions that might be experienced during conversion of the laminate or during the use of the laminate (i.e. heat sealing or retort sterilization). The interior polypropylene-based film, if present, may be the same or different than the exterior polypropylene-based film.

The interior polypropylene-based film may be an oriented polypropylene film, such as biaxially oriented polypropylene. The oriented polypropylene film may have one or more layers and may have specialized coatings, such as matte finish. Any of the layers of the oriented polypropylene film may contain a pigment, such as titanium dioxide, to make the film opaque to visible light. The film may be a cavitated biaxially oriented polypropylene, resulting in a film opaque to visible light. The biaxially oriented polypropylene may be clear to visible light. In some embodiments, the exterior polypropylene-based film is a biaxially oriented polypropylene film that essentially comprises polypropylene.

In embodiments that contain an interior polypropylene-based film, the interior polypropylene-based film may be the same as or different than the exterior polypropylene-based film. Commercial examples of films that may be used as the interior polypropylene-based film include Bicor™ NND20 (non-heat sealable, one side treated BOPP, available from Jindal Films), PL1 (non-heat sealable, one side treated BOPP, available from Polibak Plastik Film San. ve Tic.A.S.) and PPTE_LAM (non-heat sealable, one side treated, available from Poligal.

The barrier layer may be a coating or a deposition that is applied to one of the films used to build the retort packaging film. For example, the barrier layer 40 shown in the embodiment shown in FIG. 3 may be a silicon oxide material that has been deposited on the interior polypropylene-based film 50, positioned between the exterior polypropylene-based film and the interior polypropylene-based film. Or, the barrier layer 40 shown in the embodiment shown in FIG. 3 may be a silicon oxide material that has been deposited on the exterior polypropylene-based film 20, positioned between the exterior polypropylene-based film and the interior polypropylene-based film. Alternatively, the barrier layer may be a silicon oxide material that has been deposited on the side of the interior polypropylene-based film that is facing the sealant layer (this embodiment is not shown in the Figures).

Any embodiments of the retort packaging film may contain other materials and layers. For example, the film structure may contain either extruded tie layers or other adhesive layers meant to bond dissimilar materials. The film may contain ink layers at any position of the structure.

Figure 4:
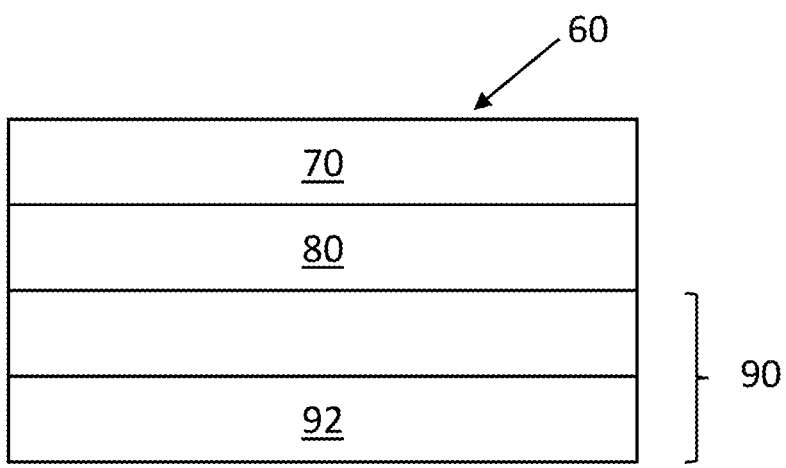
FIG. 4 is a schematic side view of an embodiment of a retort packaging film.

Also disclosed herein is a laminated polypropylene-based film suitable for retort packaging. An embodiment of the laminated polypropylene-based film 60 is shown in FIG. 4. The laminated polypropylene-based film has an exterior oriented film 70, a barrier layer 80 and a multilayer film 90 comprising a sealing layer 92. The laminated polypropylene-based film can be heat sealed to itself (sealing layer-to-sealing layer) at a sealing temperature of less than 130° C. using a pressure of 440 N/15 $cm^2$ and dwell of 1 second. In other words, when heat sealed to itself at these conditions, the sealing layers have formed a strong seal that is more than just tacky. A strong seal can be determined by measuring the force to separate the materials, wherein the average seal strength is at least 10 N/15 mm, using ASTM F88 (grip separation at 100 mm/min). In some embodiments, the heat seal strength of the laminated polypropylene-based film when heat sealed to itself is greater than 30 N/15 mm, 40 N/15 mm, or greater than 50 N/15 mm.

In some embodiments of the retort packaging film or the laminated polypropylene-based film, the exterior film, the interior film and the multilayer film are essentially free from polymers other than polyolefins.

Retort Package

Described herein are retort packaging films and laminated polypropylene-based films suitable for retort packaging as well as the retort packages and shelf-stable packaged products made therefrom. As used herein, a "retort packaging film" or "retort packaging" is a film, or package made from the film, that can be filled with product, sealed, and remain hermetically sealed after being exposed to a typical retort sterilization process.

Figure 5:
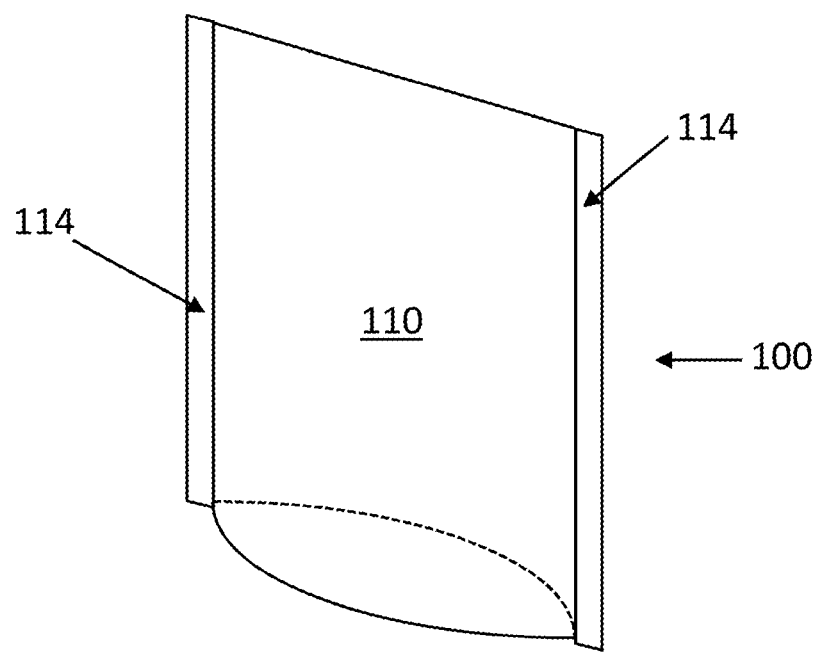
FIG. 5 is a plan view of an embodiment of a retort package.

Examples of retort package formats include, but are not limited to, a pouch or bag, a stand-up pouch (as shown in FIG. 5), a tray, cup or bowl-and-lid or a flow-wrap. A retort package may be made entirely of one or more retort packaging films as described herein. A retort package may be made of various components, including at least one retort packaging film as described herein. Any components of the retort package that are not of the retort packaging films described herein may also have high levels of polypropylene polymer. In some embodiments of the retort package, the package is made from at least one film as described herein and at least one other component, the other component having at least 90% polypropylene-based polymer, by weight, such that the entire package is recyclable in the polypropylene recycling process.

The retort package includes at least one heat seal to allow for connection of packaging components, formation of the package and hermetic closure of the package. An example of a retort package 100 that includes a retort packaging film 110 and a heat seal 114 is shown as a stand-up pouch in FIG. 5. In this embodiment, the retort package is made entirely of retort packaging films described herein, using heat seals to form and close the package.

In some embodiments of the retort package, some components of the package are not recyclable in the polypropylene recycling process. In that case the packaging components may be separated prior to recycling and/or disposal. Separation of the packaging components may be by peeling the heat seals.

In some embodiments of retort packages formed from a retort packaging film, the package has at least 90% polyolefin-based materials or at least 80% polyolefin-based materials, by weight. In some embodiments of retort packages formed from a retort packaging film, the package has at least 90% polypropylene-based materials or at least 80% polypropylene-based materials, by weight. In some embodiments of retort packages formed from a retort packaging film, the package has at least 90% polyolefin-based materials and at least 80% polypropylene-based materials, by weight.

Shelf-Stable Packaged Product

Figure 6:
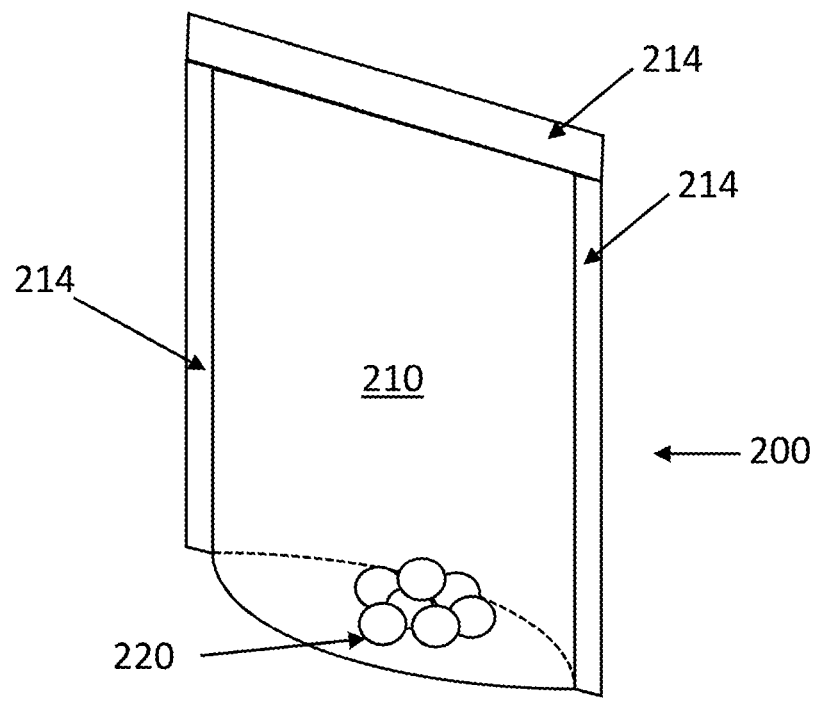
FIG. 6 is a plan view of an embodiment of a shelf-stable packaged product.

Described herein are retort packaging films and laminated polypropylene-based films suitable for retort packaging as well as the retort packages and shelf-stable packaged products made therefrom, as shown in FIG. 6. Retort packaging film 210 is used to form a retort package containing a product 220 to result in a shelf-stable packaged product 200. As discussed previously, heat seals 214 are used to form the retort package and hermetically seal the shelf-stable packaged product 200.

In some embodiments of the shelf-stable packaged product, the product in the retort package is a product that would be perishable were it not for the sterilization process it has undergone while being hermetically sealed within the retort packaging film. As used herein, the product may be a perishable food product, wherein the sterilization process (i.e. retort) enables the storage and preservation of the product at ambient conditions for many months or years. The product undergoes a sterilization process while being hermetically sealed within a package formed from a retort packaging film. Once sterilized, the retort package prevents the influx of oxygen (i.e. has high oxygen barrier properties) to help extend the shelf-life of the product.

In some embodiments of the shelf-stable packaged product, the product in the retort package is a product that maintains sterility due to being sterilized while hermetically sealed inside the package.

Figure 7:
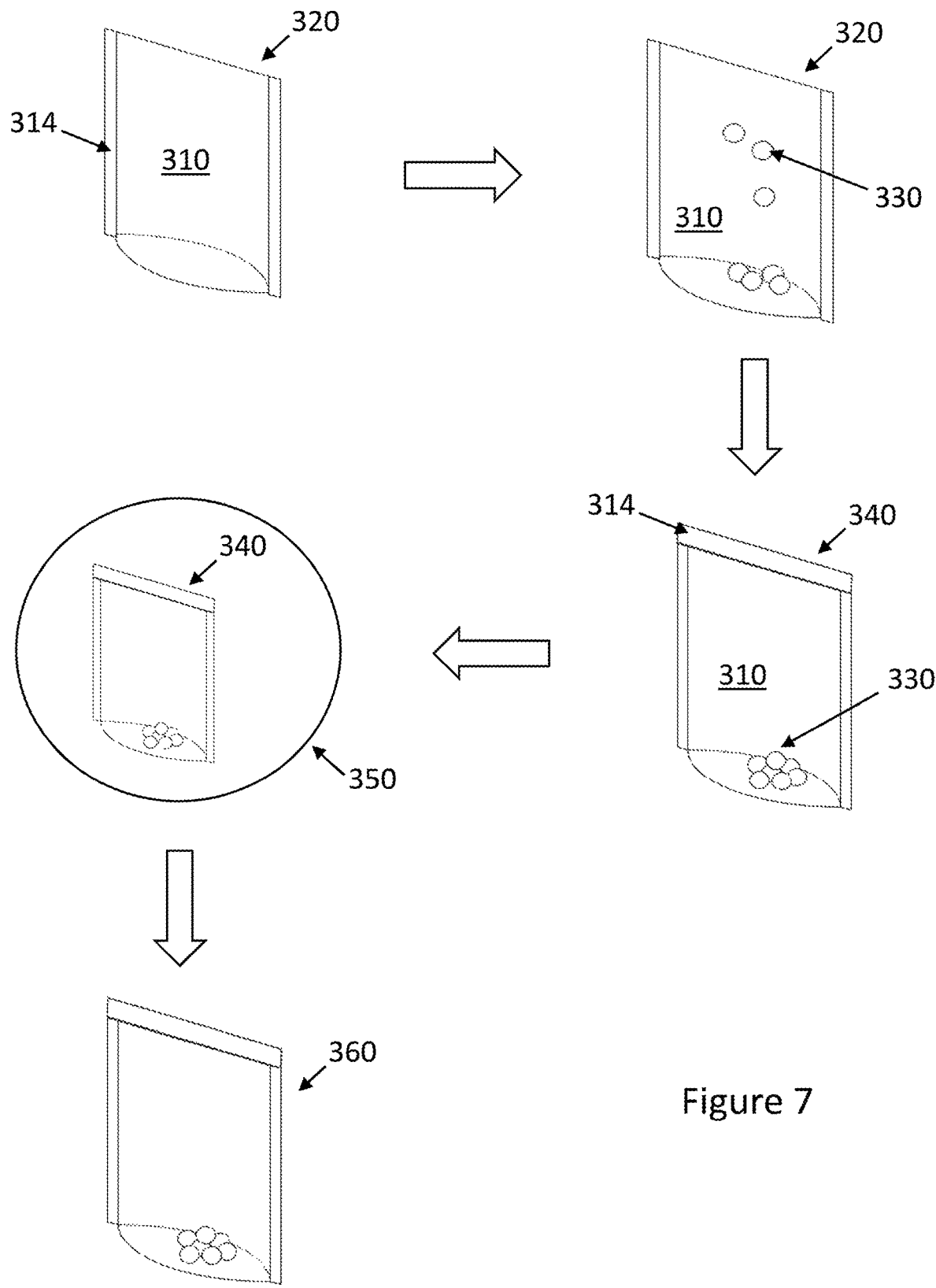
FIG. 7 is a process diagram for an embodiment of a method of producing a shelf-stable packaged product.

An embodiment of a process used to produce a shelf-stable packaged product is shown in FIG. 7. An initial package 320 is formed by heat seals 314 on a retort packaging film 310, as previously discussed. The heat seals 314 may be formed between two retort packaging films 310, as in the shown stand-up pouch configuration, or between a retort packaging film and another packaging component. The heat seals can be formed at any sealing temperature that is high enough to form a heat seal, but low enough to prevent shrinking of the retort packaging film. For example, the heat sealing temperature may be less than or equal to 160° C., less than or equal to 150° C., less than or equal to 140° C. or less than or equal to 130° C. The initial package 320 is then filled with a product 330. After filling, the initial package has an additional heat seal 314 applied to completely enclose the product within a final package 340. In other words, an initial package filled with a product is hermetically sealed to form a final package. The final package is exposed to an autoclave process 350, or another suitable sterilization process, resulting in a shelf-stable packaged product 360.

EXAMPLES & DATA

Five example retort packaging films were assembled for testing. Details of Examples 1 through 5 can be found in Table 1 below.

Each of Examples 1 through 4 were three-ply laminations and included an exterior polypropylene-based film that is a biaxially oriented polypropylene film (100% polypropylene-based materials), a barrier layer that is a silicon oxide coating deposited on a biaxially oriented polypropylene film (100% polypropylene-based materials) and a multilayer film (100% polypropylene-based materials) containing a low seal-initiation temperature sealing layer.

Example 5 was a two-ply lamination and included an exterior polypropylene-based film that is a biaxially oriented polypropylene film (100% polypropylene-based materials) with a barrier layer that is a silicon oxide coating deposited on the exterior biaxially oriented polypropylene film (100% polypropylene-based materials) and a multilayer film (100% polypropylene-based materials) containing a low seal-initiation temperature sealing layer.

The films of Examples 1 through 5 were bonded together using adhesive lamination and, in some cases, included ink as well. The adhesive used for these examples was a solvent based two-component system of Dow Adcote 811A and Catalyst C9L10, available from Dow Chemical. The ink was a retortable grade, as is known in the art. Examples 1 through 4 films were laminated so that the silicon oxide coating on the interior biaxially oriented polypropylene film was oriented so that it was facing the exterior oriented polypropylene film. For Example 5, the silicon oxide coating on the exterior biaxially oriented polypropylene film was oriented to face the multilayer film.

For each layer of the films of Examples 1 through 5, the amount of polyolefin-based material and polypropylene-based material is reported in Table 1. The biaxially oriented polypropylene films used contained 100% polypropylene-based materials (and thus 100% polyolefin-based as well). The adhesives and inks were based on other polymers, thus containing 0% polyolefin and 0% polypropylene-based materials. The SiOx coated biaxially oriented polypropylene film contained a non-olefin based lacquer and the inorganic coating, neither of which are a polyolefin or polypropylene-based material. Thus, only a portion of the weight of this layer (e.g. 16.3 g/m$^2$ out of 18.1 g/m$^2$) is counted in the total PO or PP composition. The total composition of Examples 1 through 5, as it relates to polyolefin-based materials (PO) and polypropylene-based materials (PP), as a percentage by weight is reported in Table 1.

The oxygen transmission rate (OTR) is reported for each of Examples 1 through 5. The OTR was measured according to ASTM F1927 using conditions of 1 atmosphere, 23 C and 50% RH. Post-retort OTR was measured after exposing the retort packaging film to a representative retort sterilization process (cutting a DIN A4 sized portion of the retort packaging film and exposing it to a steam sterilization process for 60 minutes at 128° C. and overpressure of 2.5 bar, followed by water shower cooling). The retort packaging films retain excellent OTR even after exposure to retort processing.

TABLE 1

| Ex. | Structure | Layer Wt (g/m$^2$) | Polyolefin Wt (g/m$^2$) | Polypropylene Wt (g/m$^2$) | OTR (cm$^3$/m$^2$/day) | Post-retort OTR (cm$^3$/m$^2$/day) |
|---|---|---|---|---|---|---|
| 1 | BOPP* | 18.1 | 18.1 | 18.1 | 0.3 | 0.5 |
|   | adhesive | 4 | 0 | 0 | | |
|   | BOPP/SiOx | 18.1 | 16.3 | 16.3 | | |

TABLE 1-continued

| Ex. | Structure | Layer Wt (g/m²) | Polyolefin Wt (g/m²) | Polypropylene Wt (g/m²) | OTR (cm³/m²/day) | Post-retort OTR (cm³/m²/day) |
|---|---|---|---|---|---|---|
|  | adhesive | 3 | 0 | 0 |  |  |
|  | multilayer film | 73.4 | 73.4 | 73.4 |  |  |
|  | Total composition: |  | 92% PO | 92% PP |  |  |
| 2 | BOPP | 18.1 | 18.1 | 18.1 | 0.09 | 0.49 |
|  | adhesive | 4 | 0 | 0 |  |  |
|  | BOPP/SiOx | 18.1 | 16.3 | 16.3 |  |  |
|  | adhesive | 3 | 0 | 0 |  |  |
|  | multilayer film | 78.3 | 78.3 | 78.3 |  |  |
|  | Total composition: |  | 93% PO | 93% PP |  |  |
| 3 | BOPP | 18.1 | 18.1 | 18.1 | 0.08 | 0.37 |
|  | ink | 3 | 0 | 0 |  |  |
|  | adhesive | 4 | 0 | 0 |  |  |
|  | BOPP/SiOx | 18.1 | 16.3 | 16.3 |  |  |
|  | adhesive | 3 | 0 | 0 |  |  |
|  | multilayer film | 78.3 | 78.3 | 78.3 |  |  |
|  | Total composition: |  | 91% PO | 91% PP |  |  |
| 4 | BOPP | 18.1 | 18.1 | 18.1 | 0.1 | 0.17 |
|  | adhesive | 4 | 0 | 0 |  |  |
|  | BOPP/SiOx | 18.1 | 16.3 | 16.3 |  |  |
|  | adhesive | 3 | 0 | 0 |  |  |
|  | multilayer film | 58.7 | 58.7 | 58.7 |  |  |
|  | Total composition: |  | 91% PO | 91% PP |  |  |
| 5 | BOPP/SiOx | 18.1 | 16.3 | 16.3 | 0.1 | 0.18 |
|  | adhesive | 4 | 0 | 0 |  |  |
|  | multilayer film | 63 | 63 | 63 |  |  |
|  | Total composition: |  | 93% PO | 93% PP |  |  |

*BOPP = biaxially oriented polypropylene film

As discussed previously, the exterior polypropylene-based film could have a surface coating such as a matte lacquer. The matte lacquer provides additional heat resistance, allowing for a thinner exterior polypropylene-based film to be feasible. Additionally, a thinner multilayer film could be used as well. The resulting film would have a lower total composition of polyolefin and polypropylene, pushing both close to 80% Details of this envisioned structure are shown in Table 2.

TABLE 2

| Structure | Layer Wt (g/m²) | Polyolefin Wt (g/m²) | Polypropylene Wt (g/m²) |
|---|---|---|---|
| matte lacquer | 2 | 0 | 0 |
| BOPP | 11.1 | 11.1 | 11.1 |
| adhesive | 4 | 0 | 0 |
| BOPP/SiOx | 18.1 | 16.3 | 16.3 |
| adhesive | 3 | 0 | 0 |
| multilayer film | 27 | 27 | 27 |
| Total composition: |  | 83% PO | 83% PP |

As discussed, portions of any of the films used in the retort packaging films may contain polyolefin-based polymers other than polypropylene. For example, the structure of Example 4 could be produced using a multilayer film containing about 20% of a polyethylene-based material. It is envisioned that the multilayer film may contain small amounts of polyethylene-based materials in various layers of the film, and still retain the properties required for retort. The result of such an inclusion of the polyethylene-based materials is that the total composition of the retort packaging film in Example 8 remains the same with respect to polyolefin-based materials but is lowered to 80% with respect to polypropylene-based materials, when compared to Example 4. Details of this type of envisioned structure are shown in Table 3.

TABLE 3

| Structure | Layer Wt (g/m²) | Polyolefin Wt (g/m²) | Polypropylene Wt (g/m²) |
|---|---|---|---|
| BOPP | 18.1 | 18.1 | 18.1 |
| adhesive | 4 | 0 | 0 |
| BOPP/SiOx | 18.1 | 16.3 | 16.3 |
| adhesive | 3 | 0 | 0 |
| multilayer film | 58.7 | 58.7 | 47.0 |
| Total composition: |  | 91% PO | 80% PP |

Heat seal data for Examples 2, 3 and 4 are shown in Table 4 below. The films were sealed to themselves (sealing layer to sealing layer) using Teflon coated heat seal bars, heated to temperatures ranging from 120° C. to 150° C. The seals were created at conditions of 1 second dwell and 440 N/15 cm² pressure. The seal strength of the seal was then tested using test method ASTM F88 (grip separation speed of 100 mm/min) and the results are reported in Table 2. Additionally, samples of the film were sealed and then exposed to retort conditions of steam sterilization for 60 minutes at 128° C. and 3.5 bar overpressure. Water shower cooling was used prior to retesting of the seal strength. All results are reported in Table 4. The sealing layers of the retort packaging film can be sealed at low temperatures, such as 130° C., minimizing any damage to the exterior layers of the film structure that may happen at higher sealing temperatures. Additionally, the seal strength remains high after exposure to retort conditions.

TABLE 4

| Seal Temp (° C.) | Example 2 Pre-retort (N/15 mm) | Example 2 Post-retort (N/15 mm) | Example 3 Pre-retort (N/15 mm) | Example 3 Post-retort (N/15 mm) | Example 4 Pre-retort (N/15 mm) | Example 4 Post-retort (N/15 mm) |
|---|---|---|---|---|---|---|
| 120 | 0 | 24 | 2.2 | 21.5 | 12.2 | 21.9 |
| 125 | 1.2 | 30.9 | 9.3 | 40.3 | 39.6 | 27.5 |
| 130 | 50.6 | 48 | 49.3 | 48.7 | 50.6 | 46.8 |
| 135 | 63.6 | 51.9 | 61.8 | 54.4 | 52.8 | 51.3 |
| 140 | 63.7 | 51.9 | 64.5 | 51.5 | 56.1 | 54.1 |
| 150 | 59.5 | 48.8 | 59.6 | 54.4 | 56.7 | 56.8 |
| 160 | N/A | N/A | N/A | N/A | 68.1 | 67.1 |

Retort Packaging Film Embodiments
 (i) A retort packaging film comprising:
  an exterior polypropylene-based film,
  a barrier layer, and
  a sealing layer,
  wherein the retort packaging film has a total composition comprising at least 80% polyolefin-based polymers by weight.
 (ii) The retort packaging film according to any other embodiment wherein the exterior polypropylene-based film is oriented.
 (iii) The retort packaging film according to any other embodiment wherein the barrier layer comprises a metal or an inorganic oxide.
 (iv) The retort packaging film according to embodiment (iii) wherein the barrier layer is deposited on a surface of the exterior polypropylene-based film.
 (v) The retort packaging film according to any other embodiment, wherein the total composition of the retort packaging film includes at least 80% polypropylene-based polymers by weight.
 (vi) The retort packaging film according to any other embodiment, wherein the total composition of the retort packaging film includes at least 90% polyolefin-based polymers by weight.
 (vii) The retort packaging film according to any other embodiment, wherein the sealing layer is within a multilayer film and the multilayer film also comprises a backing layer.
 (viii) A retort packaging film comprising:
  an exterior polypropylene-based film,
  an interior polypropylene-based film,
  a barrier layer deposited on at least one surface of the interior and exterior polypropylene-based film,
  a multilayer film comprising a sealing layer,
  wherein the retort packaging film has a total composition comprising at least 80% polypropylene-based polymers.
 (ix) The retort packaging film according to embodiment (viii), wherein at least one of the interior or exterior polypropylene-based films is oriented.
 (x) The retort packaging film according to any other embodiment wherein the sealing layer comprises a polypropylene copolymer having a melt temperature less than or equal to 135° C.
 (xi) The retort packaging film according to any other embodiment wherein the retort packaging film can be heat sealed to itself at a sealing temperature of less than 130° C. using sealing conditions of 1 second and 440 N/15 cm².
 (xii) The retort packaging film according to any other embodiment wherein the exterior oriented film and the sealing layer are essentially free from polymers other than polyolefins.

Retort Package Embodiments
 (I) A retort package formed from one or more of the retort packaging films according to any retort packaging film embodiment.
 (II) A retort package comprising a retort packaging film comprising at least 80% polyolefin-based materials, wherein the retort package comprises a heat seal.
 (III) The retort package according to embodiment (I) or (II) wherein the retort packaging film further comprises a barrier layer and the retort packaging film has an oxygen transmission rate of less than 2.0 cm³/m² day (ASTM F1927, 23C, 50% Rh).
 (IV) The retort package according to embodiment (I) or (II) wherein the retort packaging film further comprises a barrier layer and the retort packaging film has an oxygen transmission rate of less than 1.0 cm³/m² day (ASTM F1927, 23C, 50% Rh).
 (V) The retort packaging according to any other embodiment wherein the retort package essentially comprises one or more retort packaging films, each comprising at least 80% polypropylene-based materials, and at least one heat seal.

Shelf-Stable Packaged Product Embodiment
 (a) A shelf-stable packaged product comprising:
  a retort packaging film having a total composition comprising at least 80% polypropylene-based polymers, and
  a product hermetically sealed within the retort packaging film wherein the product would be perishable were it not for the sterilization process it has undergone while being hermetically sealed within the retort packaging film.

Method Embodiment
 (A) Method of producing a shelf-stable packaged product comprising:
  i) forming an initial package by heat sealing the retort packaging film according to any previous claim to itself using a temperature of less than or equal to 160° C.,
  ii) filling the initial package with a product,
  iii) heat sealing the initial package to hermetically seal the product within a final package, and
  iv) exposing the final package to an autoclave process.

What is claimed is:

1. A retort packaging film comprising:
  an exterior polypropylene-based film,
  an interior polypropylene-based film,
  a barrier layer comprising a metal oxide deposited on at least one surface of the interior and exterior polypropylene-based film,
  a multilayer film comprising a sealing layer comprising a polypropylene copolymer having a melt temperature less than or equal to 135° C.,
 wherein the retort packaging film has a total composition comprising at least 80% polypropylene-based polymers, by weight.

2. The retort packaging film according to claim 1, wherein at least one of the interior or exterior polypropylene-based films is oriented.

3. A retort package formed from one or more of the retort packaging films according to claim 1.

4. A retort package comprising a retort packaging film comprising at least 88% polyolefin-based materials by weight, wherein the retort package comprises a heat seal comprising a polypropylene copolymer having a melt temperature less than or equal to 135° C. and a barrier layer comprising an inorganic oxide.

5. The retort package according to claim 4 wherein the retort packaging film has an oxygen transmission rate of less than 2.0 cm$^3$/m$^2$ day (ASTM F1927, 23C, 50% Rh).

6. The retort package according to claim 4 wherein the retort packaging film has an oxygen transmission rate of less than 1.0 cm$_3$/m$_2$ day (ASTM F1927, 23C, 50% Rh).

7. The retort packaging according to claim 4 wherein the retort package essentially comprises one or more retort packaging films, each comprising at least 80% polypropylene-based materials by weight, and at least one heat seal.

* * * * *